United States Patent
Liu et al.

(10) Patent No.: US 8,628,688 B2
(45) Date of Patent: Jan. 14, 2014

(54) BORATE PHOSPHOR AND WHITE LIGHT ILLUMINATION DEVICE UTILIZING THE SAME

(75) Inventors: Wei-Jen Liu, Taoyuan (TW); Yi-Chen Chiu, Hsinchu (TW); Chien-Yueh Tung, Taipei (TW); Yao-Tsung Yeh, Taoyuan (TW); Shyue-Ming Jang, Hsinchu (TW); Teng-Ming Chen, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 0 days.

(21) Appl. No.: 13/463,026

(22) Filed: May 3, 2012

(65) Prior Publication Data

US 2012/0212934 A1 Aug. 23, 2012

Related U.S. Application Data

(62) Division of application No. 12/132,612, filed on Jun. 4, 2008, now Pat. No. 8,207,661.

(30) Foreign Application Priority Data

Mar. 20, 2008 (TW) .............................. 97109808 A

(51) Int. Cl.
C09K 11/70 (2006.01)
C09K 11/72 (2006.01)
C09K 11/77 (2006.01)

(52) U.S. Cl.
USPC .................... 252/301.6 R; 313/503

(58) Field of Classification Search
USPC ...................... 252/301.6 R; 313/503
See application file for complete search history.

(56) References Cited

U.S. PATENT DOCUMENTS

| | | | | | |
|---|---|---|---|---|---|
| 2,056,545 | A | * | 10/1936 | Varian | 252/301.6 S |
| 2,310,852 | A | * | 2/1943 | Leverenz | 428/212 |
| 2,631,133 | A | * | 3/1953 | Wollentin | 252/301.6 R |
| 3,375,465 | A | * | 3/1968 | Brixner | 372/41 |
| 4,202,794 | A | | 5/1980 | Lehmann | |
| 5,132,043 | A | | 7/1992 | Deboer | |
| 6,007,741 | A | | 12/1999 | Hunt, Jr. et al. | |
| 6,084,250 | A | * | 7/2000 | Justel et al. | 257/89 |
| 6,085,971 | A | | 7/2000 | Tews et al. | |
| 6,165,385 | A | | 12/2000 | Rao et al. | |
| 6,252,254 | B1 | | 6/2001 | Soules et al. | |
| 6,407,498 | B1 | | 6/2002 | Justel et al. | |
| 6,905,636 | B2 | | 6/2005 | Yuan et al. | |
| 6,943,380 | B2 | | 9/2005 | Ota et al. | |
| 7,056,451 | B2 | | 6/2006 | Manivannan et al. | |

(Continued)

OTHER PUBLICATIONS

Li. Synthesis, photoluminescence, thermoluminescence and dosimetry properties of novel phosphor Zn(BO2)2:Tb, Journal of Physics and Chemistry of SOlids 68, 2007, 143-147.*

(Continued)

*Primary Examiner* — Carol M Koslow
*Assistant Examiner* — Matthew E Hoban
(74) *Attorney, Agent, or Firm* — Pai Patent & Trademark Law Firm; Chao-Chang David Pai

(57) ABSTRACT

Borate phosphors have a formula $Zn_{1-x-y}B_2O_4:Eu^{3+}_x, Bi^{3+}_y$ (wherein $0 \leq x \leq 0.6$ and $0 \leq y \leq 0.6$) emit visible light under the excitation of ultraviolet light or blue light, and may be further collocated with different colored phosphors to provide a white light illumination device.

7 Claims, 20 Drawing Sheets

(56) References Cited

U.S. PATENT DOCUMENTS

| | | |
|---|---|---|
| 7,060,202 B2 | 6/2006 | Shi et al. |
| 7,088,038 B2 | 8/2006 | Srivastava et al. |
| 7,122,128 B2 | 10/2006 | Comanzo et al. |
| 7,128,849 B2 | 10/2006 | Setlur et al. |
| 7,176,501 B2 | 2/2007 | Lee et al. |
| 7,274,045 B2 | 9/2007 | Chandran et al. |
| 7,303,697 B2 * | 12/2007 | Isobe ................ 252/301.6 F |
| 2005/0094620 A1 | 5/2005 | Calcev |
| 2006/0011890 A1 | 1/2006 | Isobe |
| 2006/0208270 A1 | 9/2006 | Chandran et al. |

OTHER PUBLICATIONS

Brixner. "On the Luminescent Properties of Some Rare Earth Ions in Zinc Borate as a Host" Journal of the Electrochemical Society Oct. 1965. 984-988.*

Wang. Novel red phosphor of $Bi^{3+}$, $Sm^{3+}$ co-activated $NaEu(MoO_4)_2$. Optical Materials vol. 29, Issue 7, Mar. 2007, pp. 896-900.*

Examination opinion issued by the Taiwan Intellectual Property Office on Oct. 24, 2011, for the above-referenced application's counterpart application in Taiwan (Application No. 097109808 filed Mar. 20, 2008).

* cited by examiner

BORATE PHOSPHOR AND WHITE LIGHT ILLUMINATION DEVICE UTILIZING THE SAME

CROSS REFERENCE TO RELATED APPLICATIONS

The present application is a division of prior U.S. application Ser. No. 12/132,612 filed Jun. 4, 2008, entitled "BORATE PHOSPHOR AND WHITE LIGHT ILLUMINATION DEVICE UTILIZING THE SAME". The prior U.S. application claims priority of Taiwan Patent Application No. 097109808, filed on Mar. 20, 2008, the entirety of which is incorporated by reference herein.

BACKGROUND

1. Technical field

The present disclosure relates to a borate phosphor, and in particular relates to a white light illumination device utilizing the same.

2. Description of the Related Art

Commercially available white light illumination devices such as light emitting diodes (hereinafter LED), have gradually replaced conventional tungsten lamps or fluorescent lamps due to high luminescence efficiency and eco-friendliness. For white LEDs, the phosphor composition located within, is a critical factor determining luminescence efficiency, color rendering, color temperature, and lifespan of white LEDs.

In general, the excitation light source of conventional phosphors is a short wavelength ultraviolet light (UV) such as 147 nm, 172 nm, 185 nm, or 254 nm. The phosphors excited by the short wavelength UV have high light absorption and light transfer efficiency. Compared with phosphors excited by short wavelength UV, phosphors excited by long wavelength UV or visible light (350-470 nm) are rare.

SUMMARY

The disclosure provides a borate phosphor having a formula: $Ca_{1-x}AlBO_4:M_x$, wherein M is $Pr^{3+}$, $Nd^{3+}$, $Eu^{3+}$, $Eu^{2+}$, $Gd^{3+}$, $Tb^{3+}$, $Ce^{3+}$, $Dy^{3+}$, $Yb^{2+}$, $Er^{3+}$, $Sc^{3+}$, $Mn^{2+}$, $Zn^{2+}$ or combinations thereof, and $0 \leq x \leq 0.3$.

The disclosure also provides a borate phosphor having a formula: $Zn_{1-x-y}B_2O_4:Eu^{3+}_x$, $Bi^{3+}_y$, wherein $0 \leq x \leq 0.6$ and $0 \leq y \leq 0.6$.

The disclosure further provides a white light illumination device comprising the borate phosphor as described as above and an excitation light source, wherein the excitation light source emits 200-400 nm UV or 400-470 nm blue light.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
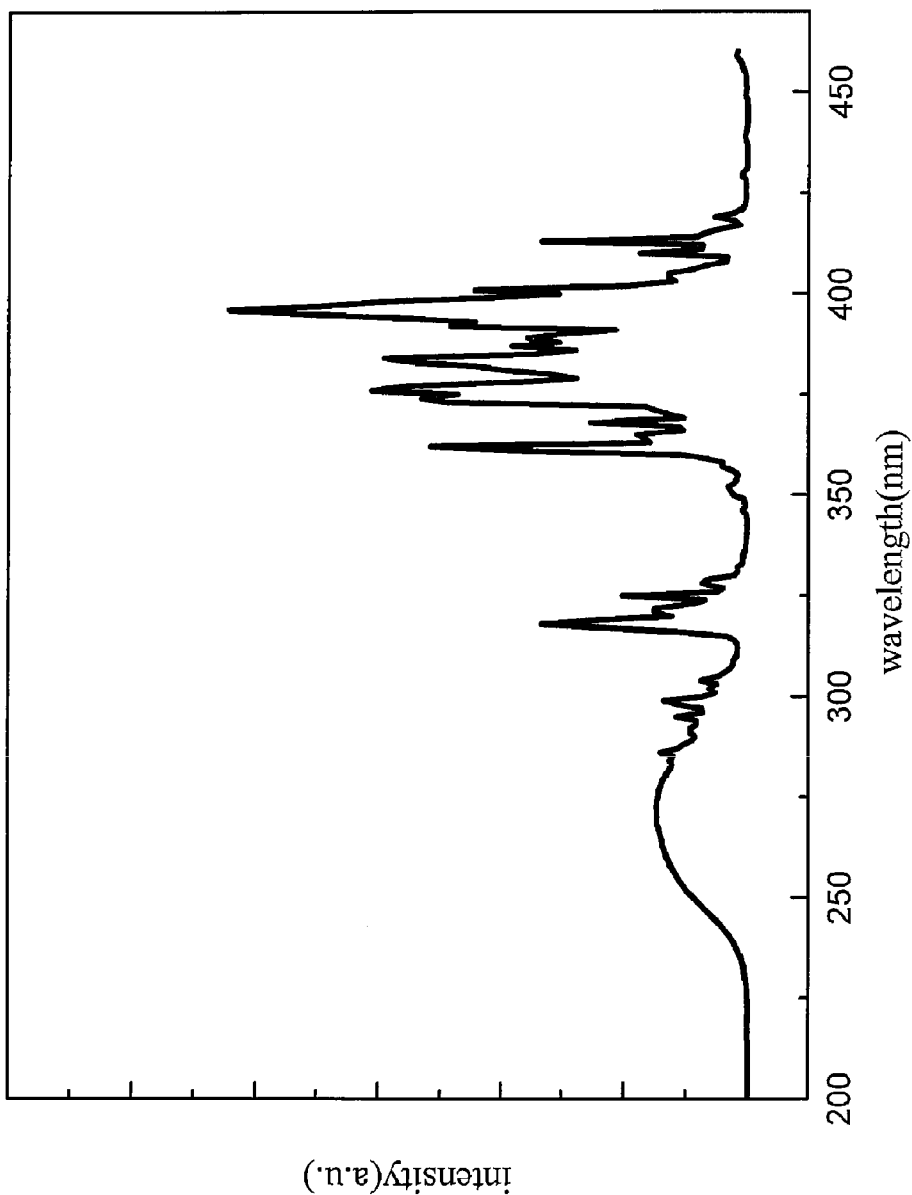
FIG. 1 is a photoluminescence excitation spectrum of the borate phosphor $Ca_{0.93}AlBO_4:Eu^{3+}_{0.07}$ in one example of the disclosure.

The following description is of the best-contemplated mode of carrying out the disclosure. This description is made for the purpose of illustrating the general principles of the disclosure and should not be taken in a limiting sense. The scope of the disclosure is best determined by reference to the appended claims.

The disclosure provides a borate phosphor, having a formula as $Ca_{1-x}AlBO_4:M_x$, wherein M is $Pr^{3+}$, $Nd^{3+}$, $Eu^{3+}$, $Eu^{2+}$, $Gd^{3+}$, $Tb^{3+}$, $Ce^{3+}$, $Dy^{3+}$, $Yb^{2+}$, $Er^{3+}$, $Sc^{3+}$, $Mn^{2+}$, $Zn^{2+}$, or combinations thereof, and $0 \leq x \leq 0.3$. For example, the borate phosphors can be $Ca_{1-x}AlBO_4:Eu^{3+}{}_x$, $Ca_{1-x}AlBO_4:Tb^{3+}{}_x$, $Ca_{1-x}AlBO_4:Mn^{2+}{}_x$, $Ca_{1-x}AlBO_4:Eu^{2+}{}_x$, or $Ca_{1-x}AlBO_4:Ce^{3+}{}_x$.

The disclosure provides a borate phosphor having a formula as $Zn_{1-x-y}B_2O_4:Eu^{3+}{}_x, Bi^{3+}{}_x, Bi^{3+}{}_y$, wherein $0 \leq x \leq 0.6$ and $0 \leq y \leq 0.6$. When x is zero and only $Bi^{3+}$ is doped, the borate is a blue phosphor. When y is zero and only $Eu^{3+}$ is doped, the borate is a red phosphor. In one embodiment, the borate doped with $Eu^{3+}$ and $Bi^{3+}$ emits brighter red light than the borate doped with only $Eu^{3+}$, because the borate doped with $Eu^{3+}$ is not only directly excited by the excitation light source but also indirectly excited by the blue light from the borate doped with $Bi^{3+}$.

After excited by blue light (400 nm to 470 nm) or UV (200 nm to 400 nm), the borate phosphors may emit visible lights with different wavelength. In addition, the excitation light source of the borate phosphors can be a light-emitting diode or a laser diode.

The method for preparing the described aluminosilicate is by solid-state reaction. First, the appropriate stoichiometry of reagents was weighted according to the element molar ratio of the resulting borates. The reagents containing Ca can be oxide (CaO) or carbonate ($CaCO_3$). The reagents containing Al can be oxide such as $\gamma$-$Al_2O_3$. The reagents containing $Pr^{3+}$, $Nd^{3+}$, $Bi^{3+}$, $Eu^{3+}$, $Eu^{2+}$, $Gd^{3+}$, $Tb^{3+}$, $Ce^{3+}$, $Dy^{3+}$, $Yb^{2+}$, $Er^{3+}$, $Sc^{3+}$, $Mn^{2+}$, $Zn^{2+}$, or combinations thereof can be chlorides such as $EuCl_2$ and the likes, fluorides such as $CeF_3$ and the likes, oxides such as $Mn_3O_4$, $MnO_2$, $Eu_2O_3$, $Bi_2O_3$, $CeO_2$, and the likes, carbonates such as $MnCO_3$ and the likes, acetates such as $Mn(CH_3COO)_2$ and the likes, and nitrates such as $Ce(NO_3)_3$ and the likes. The boron containing reagents includes oxides such as boron oxide ($B_2O_3$) or boric acid ($H_3BO_3$). The described reagents were evenly mixed and grinded, and charged in a double-crucible. The double-crucible was then stuffed by graphite, and then heated in a high temperature furnace. After sintering at 700-1000° C. for several hours, washing, and heat drying, the described borate phosphors were prepared.

In one embodiment, the borate phosphor emits red light after being excited by blue light or UV light. In this embodiment, the borate phosphors may collocate with a UV excitable blue phosphor and a UV or blue light excitable green phosphor. Arranged with a UV excitation light source such as light-emitting diode or laser diode, a white light emitting diode or white laser diode is completed. The described blue phosphor includes $BaMgAl_{10}O_{17}:Eu^{2+}$, $(Ba,Sr,Ca)_5(PO_4)_3(F,Cl,Br,OH):Eu^{2+}$, $2SrO \cdot 0.84P_2O_5 \cdot 0.16B_2O_3:Eu^{2+}$, $Sr_2Si_3O_8 \cdot 2SrCl_2:Eu^{2+}$, $(Mg,Ca,Sr,Ba,Zn)_3B_2O_6:Eu^{2+}$, and other suitable blue phosphors. The described green phosphor includes $BaMgAl_{10}O_{17}:Eu^{2+},Mn^{2+}$, $SrGa_2S_4:Eu^{2+}$, $(Ca,Sr,Ba)Al_2O_4:Eu^{2+},Mn^{2+}$, $(Ca,Sr,Ba)_4Al_{14}O_{25}:Eu^{2+}$, $Ca_8Mg(SiO_4)_4Cl_2:Eu^{2+},Mn^{2+}$, and other suitable green phosphors. If the blue, green, and red phosphors are UV excitable, the blue, green, and red phosphors are directly excited by the excitation light source. If the green and red phosphors are blue light excitable, the red and green phosphors are indirectly excited by blue light from the blue phosphor. The combination and ratio of blue, green and red phosphors are optional in different applications of direct or indirect excitation.

For the white light illumination device such as described, a white light emitting diode or white laser diode, and the red/green/blue phosphors can be evenly mixed in preferable ratio and dispersed in an optical gel. The optical gel containing the phosphors may further seal a near UV excitation light source such as a chip of a light emitting diode or a laser diode. Note that if UV is selected as the excitation light source, a UV filter or another UV insulator should be arranged externally from the white light illumination device to protect user's eyes and skin.

EXAMPLES

Example 1

Figure 2:
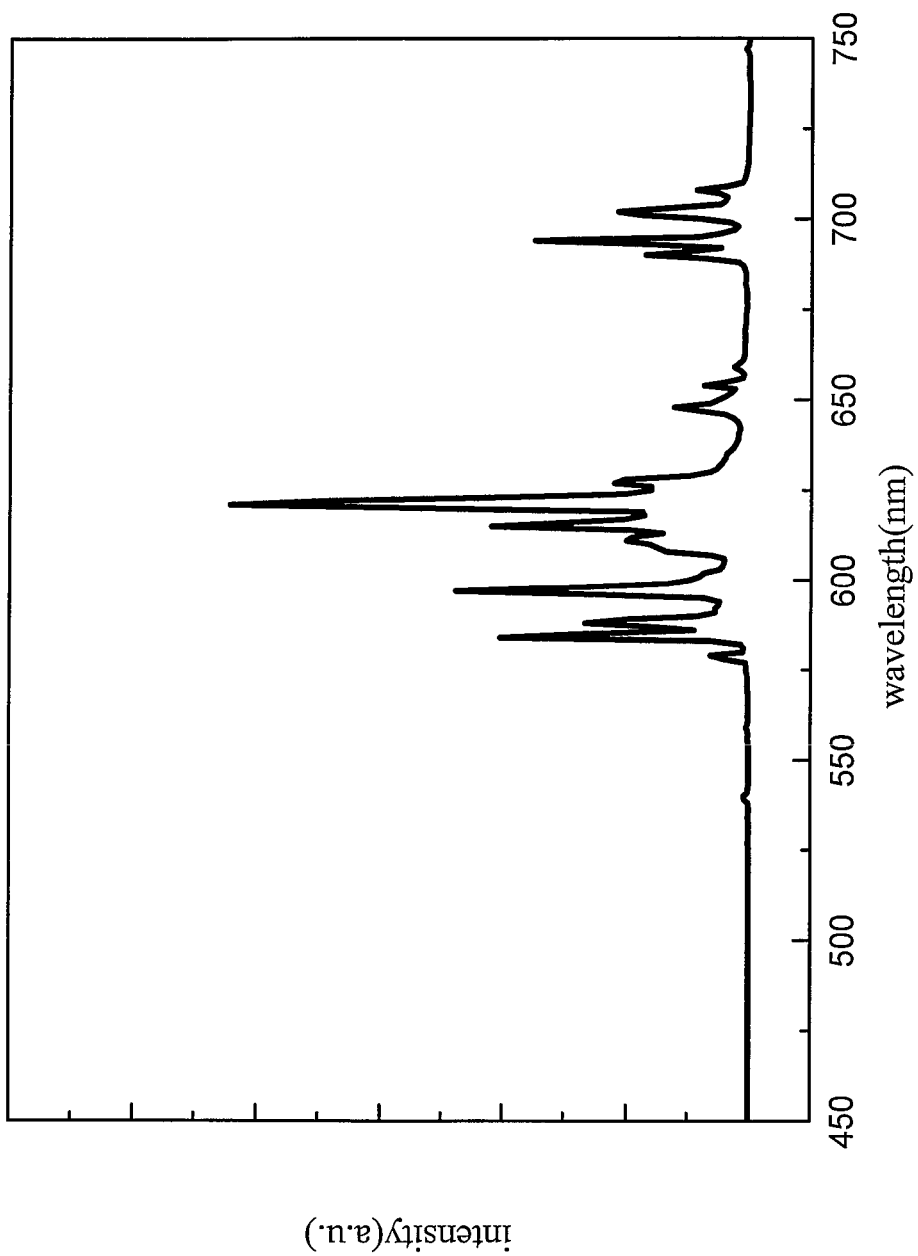
FIG. 2 is a photoluminescence emission spectrum of the borate phosphor $Ca_{0.93}AlBO_4:Eu^{3+}_{0.07}$ in one example of the disclosure.

0.93 mol of $CaCO_3$ (0.4654 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.035 mol of $Eu_2O_3$ (0.0616 g, FW=351.917, commercially available from ALDRICH, 99.9%) were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphor $Ca_{0.93}AlBO_4:Eu^{3+}{}_{0.07}$ was prepared. The photoluminescence excitation and emission spectra of the described product are shown in FIGS. 1 and 2, respectively. The major peak of the excitation band is 396 nm, the major peak of the emission band is 621 nm, and the CIE coordination is (0.54, 0.31).

Example 2

Figure 3:
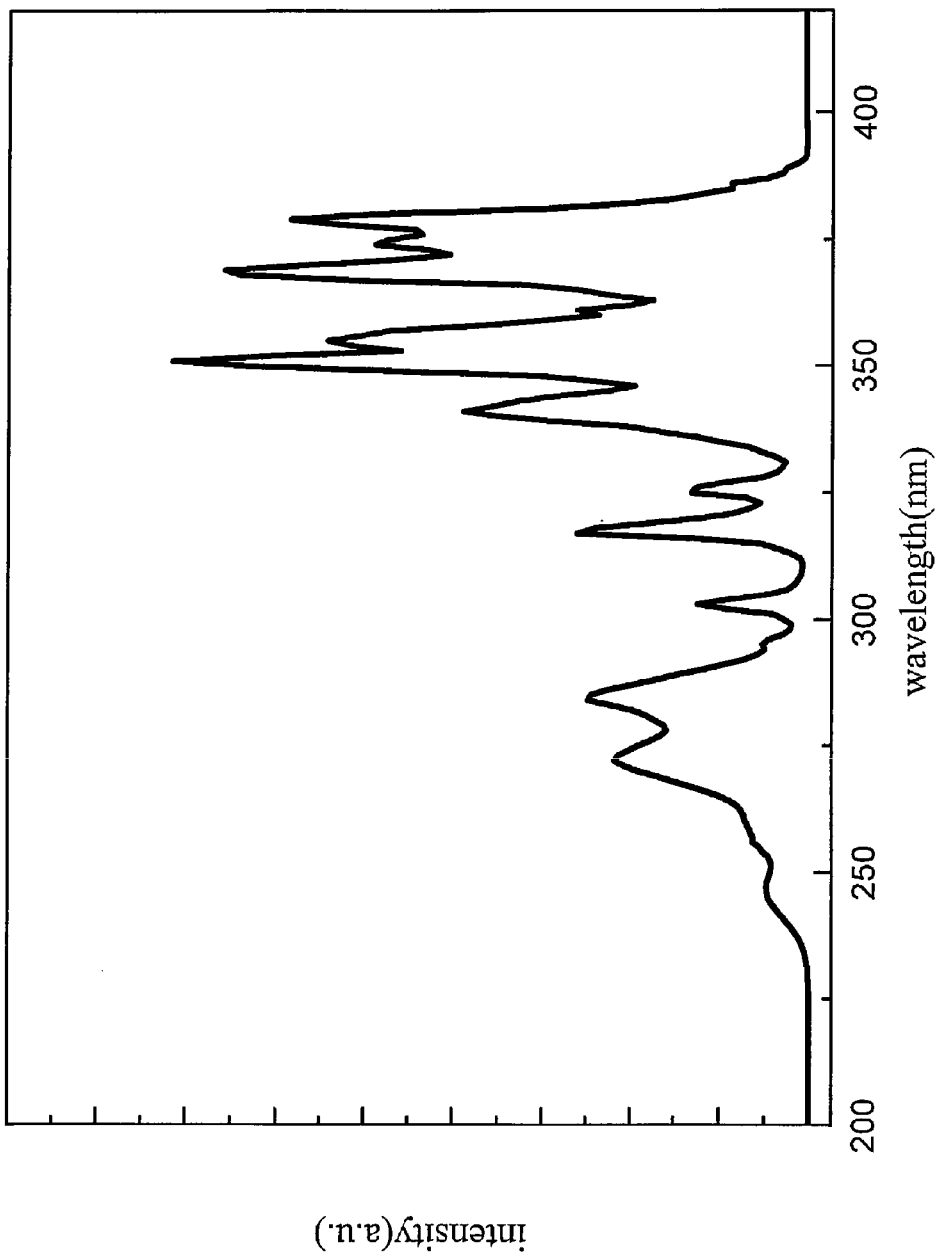
FIG. 3 is a photoluminescence excitation spectrum of the borate phosphor $Ca_{0.9}AlBO_4:Tb^{3+}_{0.1}$ in one example of the disclosure.
Figure 4:
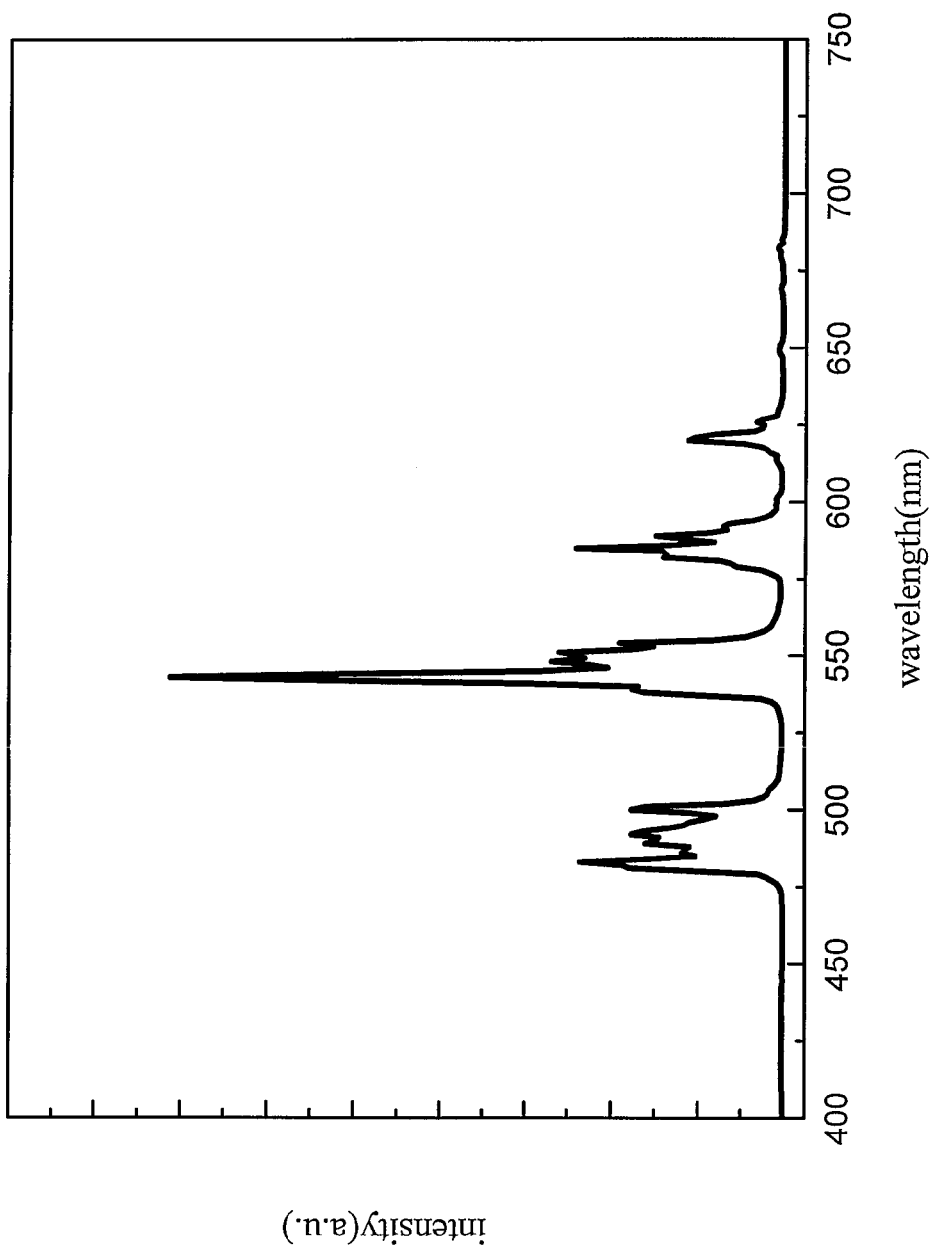
FIG. 4 is a photoluminescence emission spectrum of the borate phosphor $Ca_{0.9}AlBO_4:Tb^{3+}_{0.1}$ in one example of the disclosure.

0.90 mol of $CaCO_3$ (0.4504 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.025 mol of $Tb_4O_7$ (0.0935 g, FW=747.713, commercially available from STREM, 99.9%) were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphor $Ca_{0.9}AlBO_4:Tb^{3+}{}_{0.1}$ was prepared. The photoluminescence excitation and emission spectra of the described product are shown in FIGS. 3 and 4, respectively. The major peak of the excitation band is 351 nm, the major peak of the emission band is 543 nm, and the CIE coordination is (0.36, 0.50).

Example 3

Figure 5:
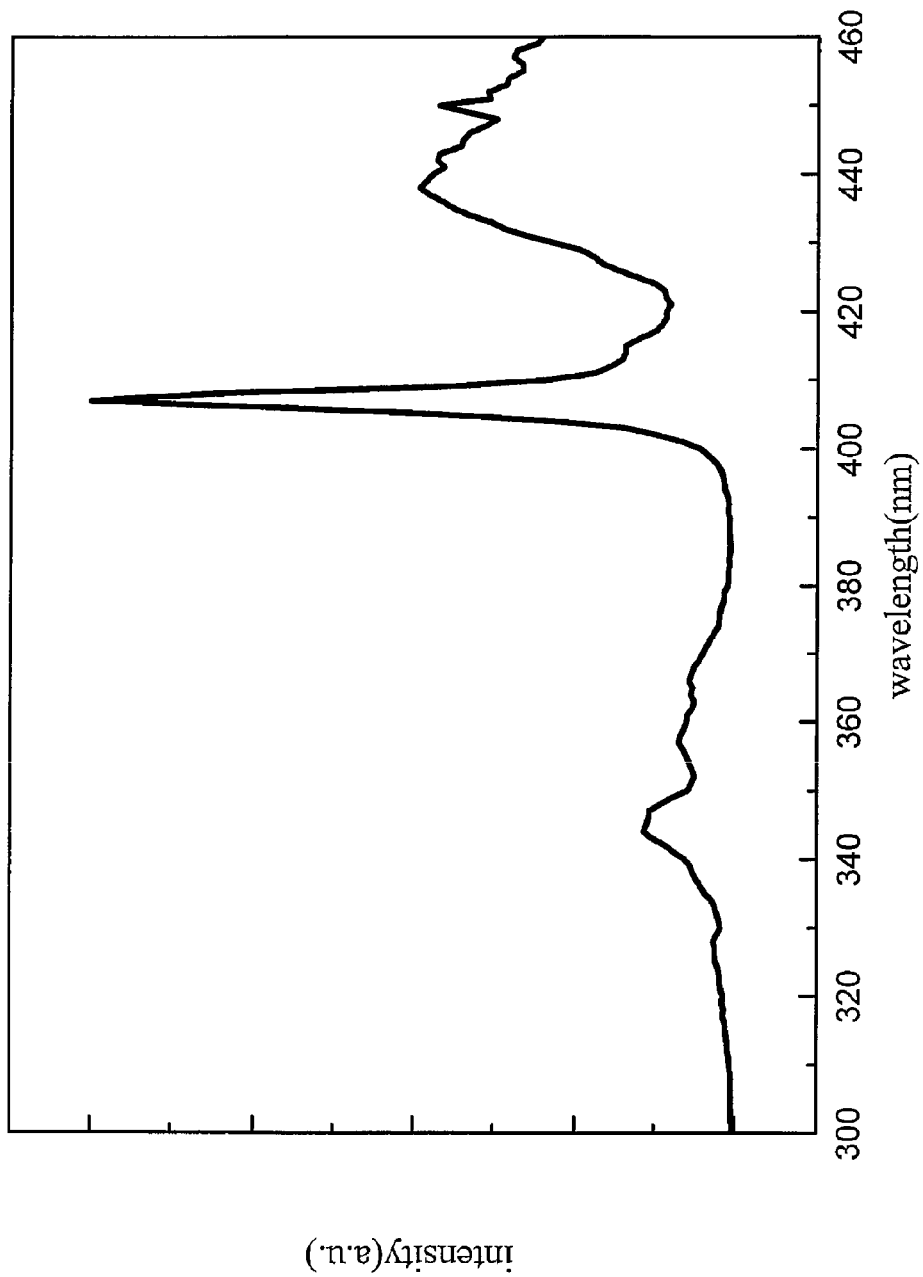
FIG. 5 is a photoluminescence excitation spectrum of the borate phosphor $Ca_{0.98}AlBO_4:Mn^{2+}_{0.02}$ in one example of the disclosure.
Figure 6:
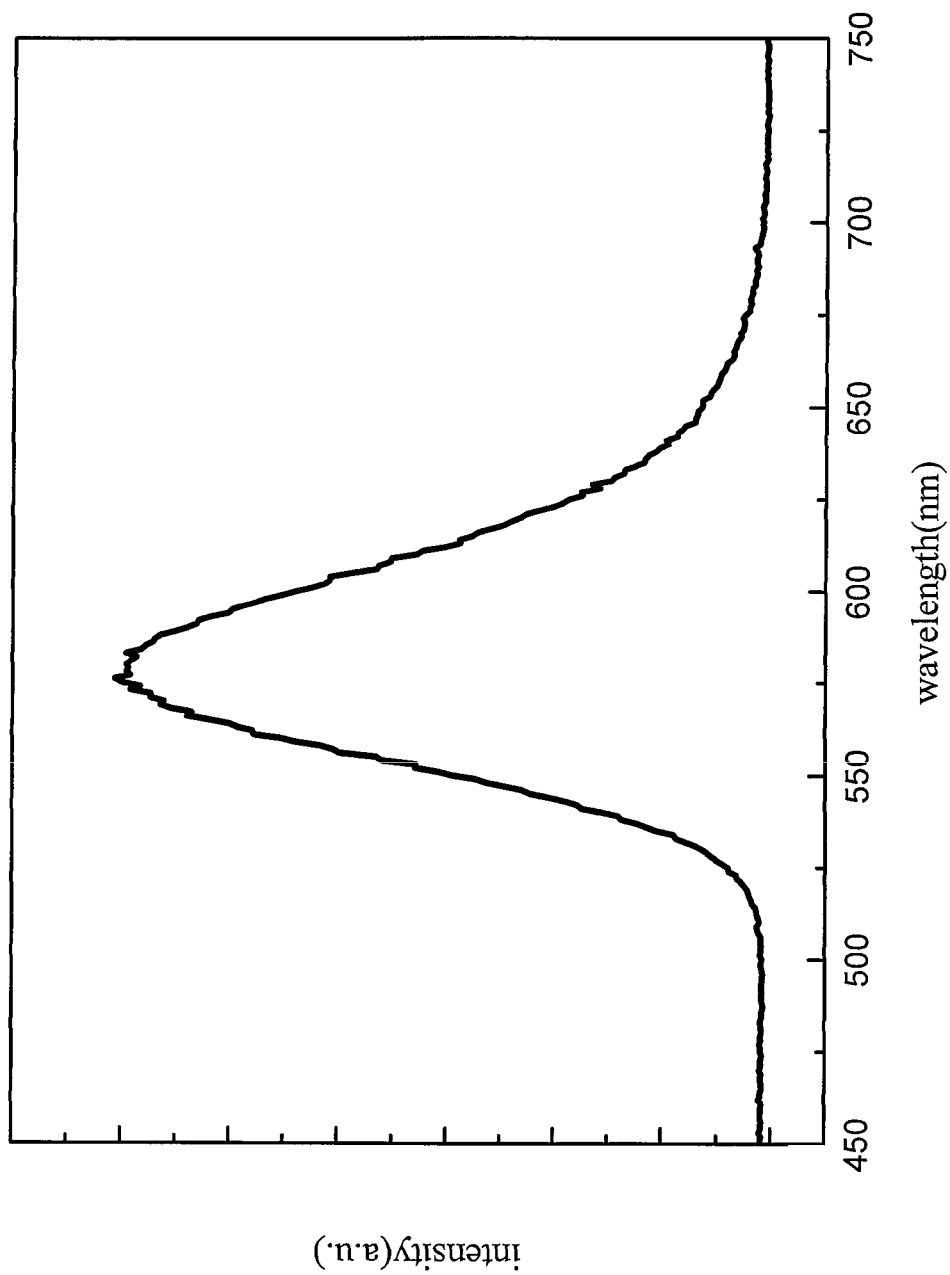
FIG. 6 is a photoluminescence emission spectrum of the borate phosphor $Ca_{0.98}AlBO_4:Mn^{2+}_{0.02}$ in one example of the disclosure.

0.98 mol of $CaCO_3$ (0.4904 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.02 mol of MnO (0.0071 g, FW=70.937, commercially available from ALDRICH, 99.99+%) were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphor $Ca_{0.98}AlBO_4:Mn^{2+}{}_{0.02}$ was prepared. The photoluminescence excitation and emission spectra of the described product are shown in FIGS. 5 and 6, respectively. The major peak of the excitation band is 407 nm, the major peak of the emission band is 578 nm, and the CIE coordination is (0.43, 0.41).

Example 4

Figure 7:
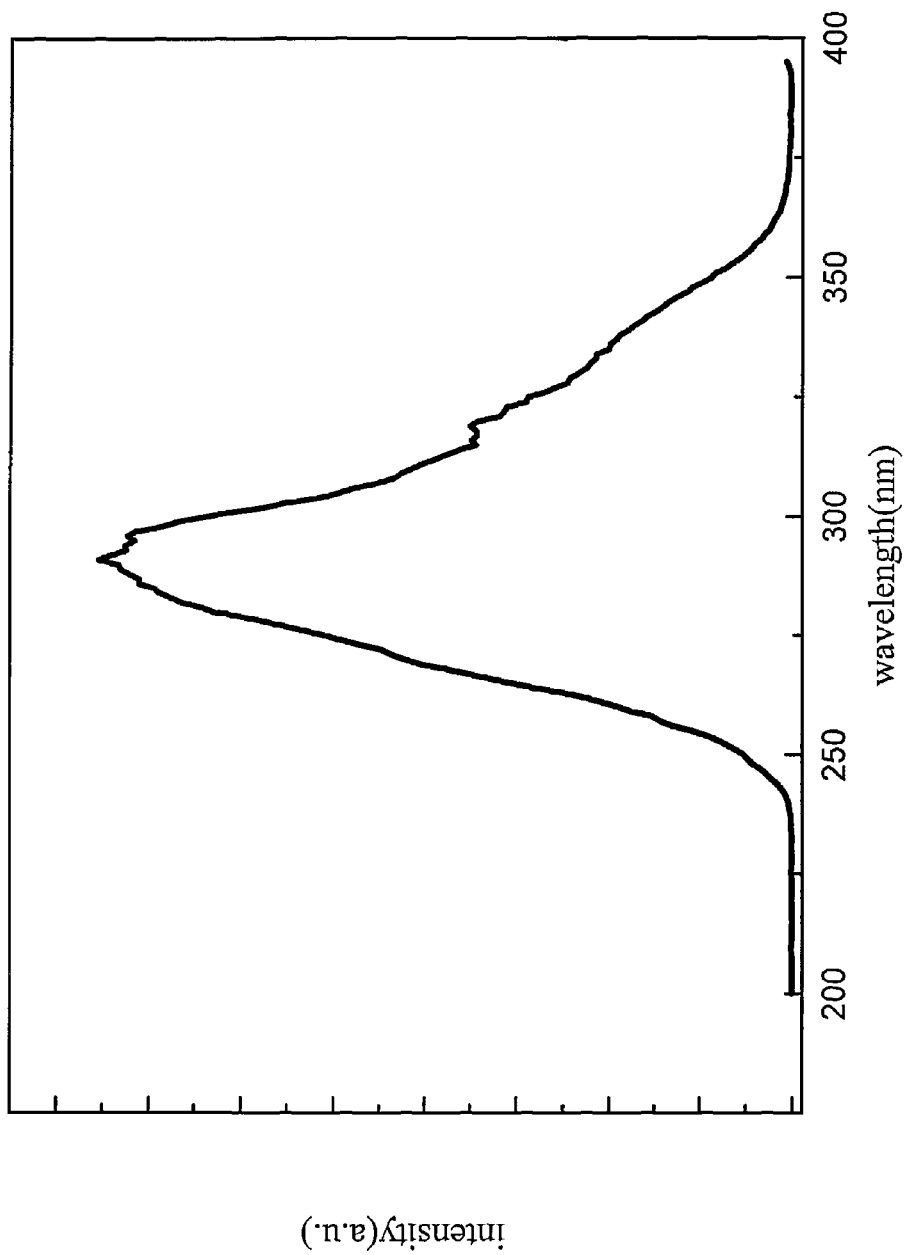
FIG. 7 is a photoluminescence excitation spectrum of the borate phosphor $Ca_{0.98}AlBO_4:Eu^{2+}_{0.02}$ in one example of the disclosure.
Figure 8:
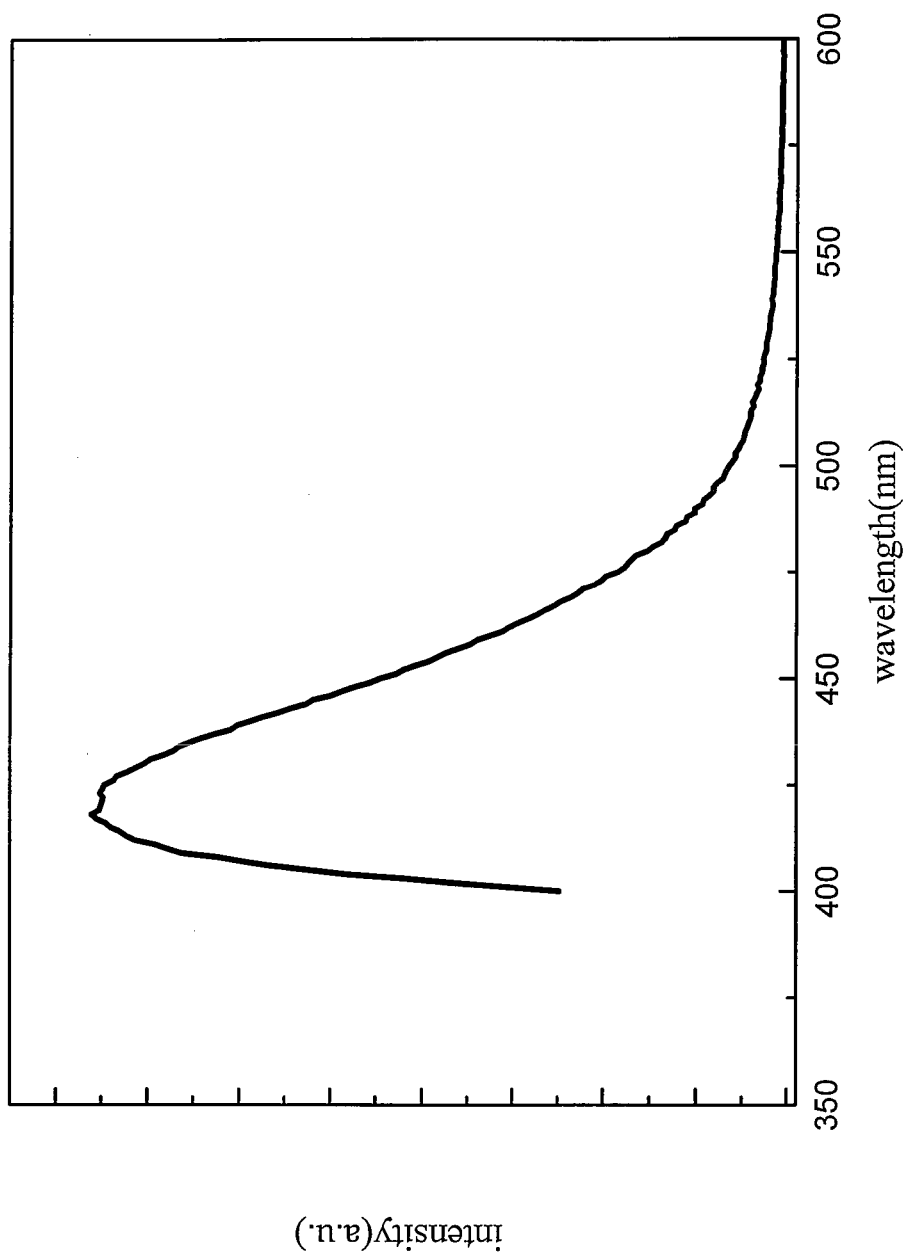
FIG. 8 is a photoluminescence emission spectrum of the borate phosphor $Ca_{0.98}AlBO_4:Eu^{2+}_{0.02}$ in one example of the disclosure.

0.98 mol of $CaCO_3$ (0.4904 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.01 mol of $Eu_2O_3$ (0.0176 g, FW=351.917, commercially available from ALDRICH, 99.9%) were weighted, evenly mixed and grinded, and charged in a double-crucible. The double-crucible was then stuffed by graphite, and then heated in a high temperature furnace. After sintering in reductive atmosphere (10% $H_2$/90% $N_2$) at 1000° C. for about 10 hours, washing, filtering, and heat drying, pure phase of the borate phosphor $Ca_{0.98}AlBO_4:Eu^{2+}_{0.02}$ was prepared. The photoluminescence excitation and emission spectra of the described product are shown in FIGS. 7 and 8, respectively. The major peak of the excitation band is 291 nm, the major peak of the emission band is 420 nm, and the CIE coordination is (0.16, 0.03).

Example 5

Figure 9:
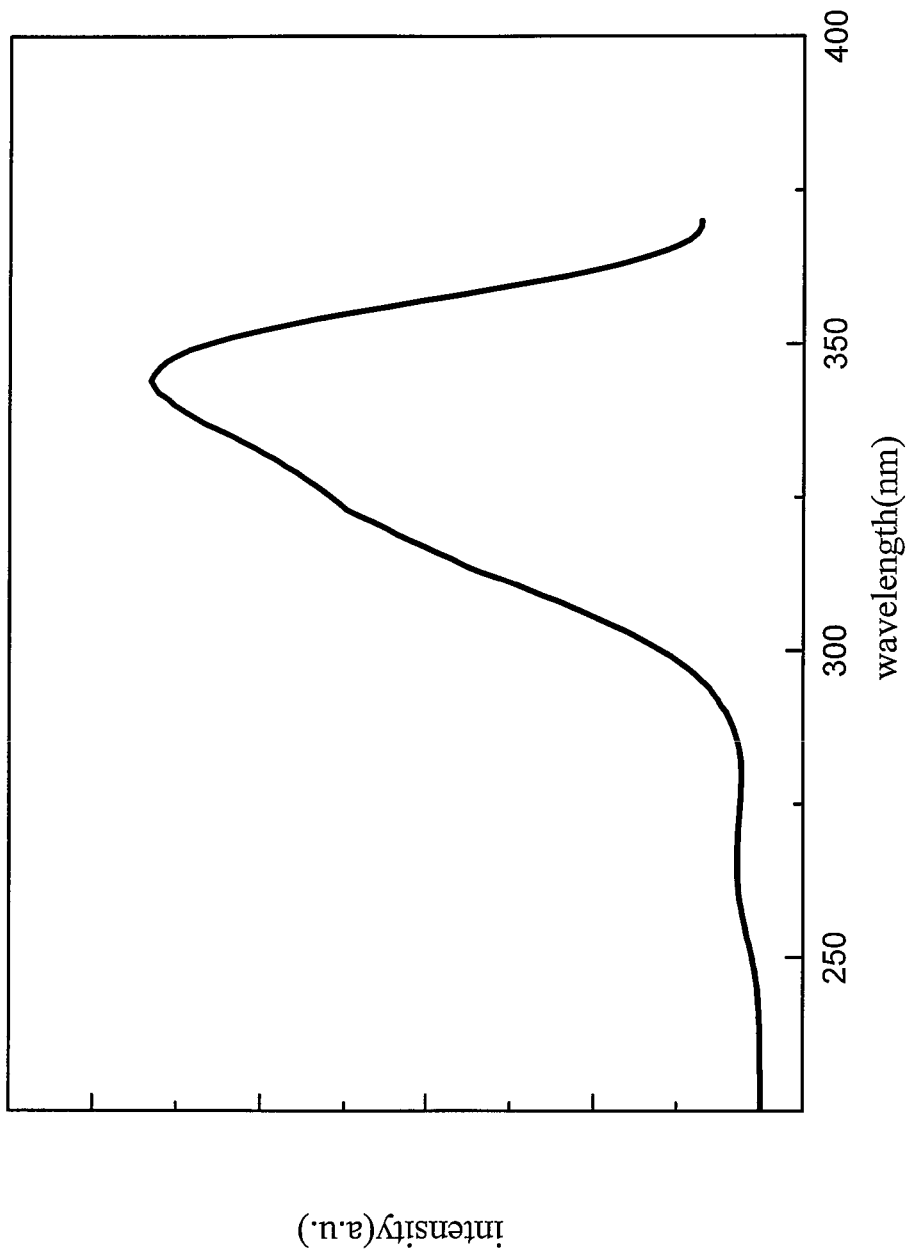
FIG. 9 is a photoluminescence excitation spectrum of the borate phosphor $Ca_{0.98}AlBO_4:Ce^{3+}_{0.02}$ in one example of the disclosure.
Figure 10:
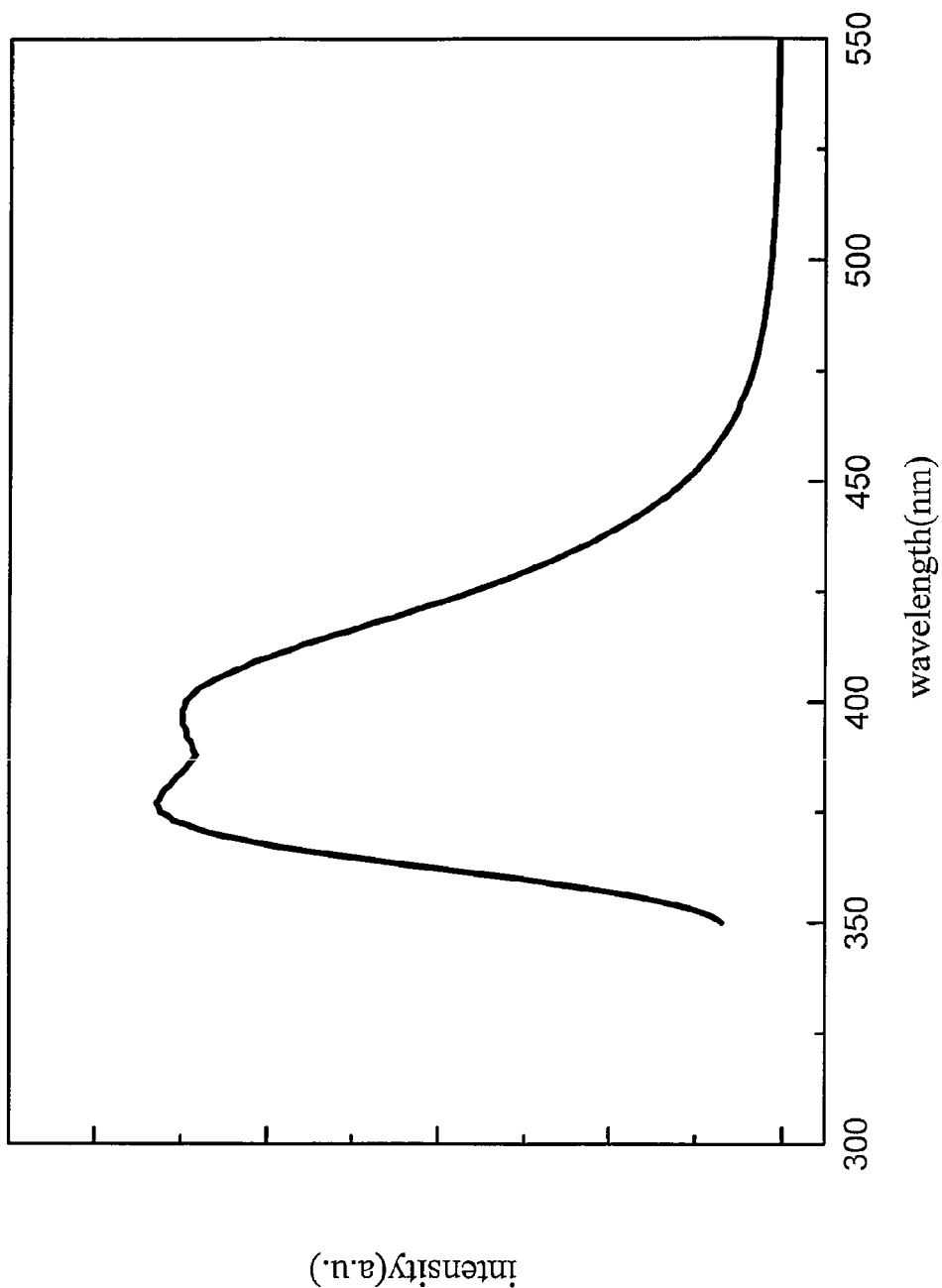
FIG. 10 is a photoluminescence emission spectrum of the borate phosphor $Ca_{0.98}AlBO_4:Ce^{3+}_{0.02}$ in one example of the disclosure.

0.98 mol of $CaCO_3$ (0.4904 g, FW=100.086, commercially available from ALDRICH, 99.99%), 1 mol of $Al_2O_3$ (0.2549 g, FW=101.961, commercially available from ALDRICH, 99.99%), 1 mol of $B_2O_3$ (0.1740 g, FW=69.619, commercially available from STREM, >99.9%), and 0.02 mol of $CeO_2$ (0.0172 g, FW=172.118, commercially available from STREM, 99.99%) were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphor $Ca_{0.98}AlBO_4:Ce^{3+}_{0.02}$ was prepared. The photoluminescence excitation and emission spectra of the described product are shown in FIGS. 9 and 10, respectively. The major peak of the excitation band is 344 nm, the major peak of the emission band is 377 nm, and the CIE coordination is (0.16, 0.04).

Example 6

Figure 11:
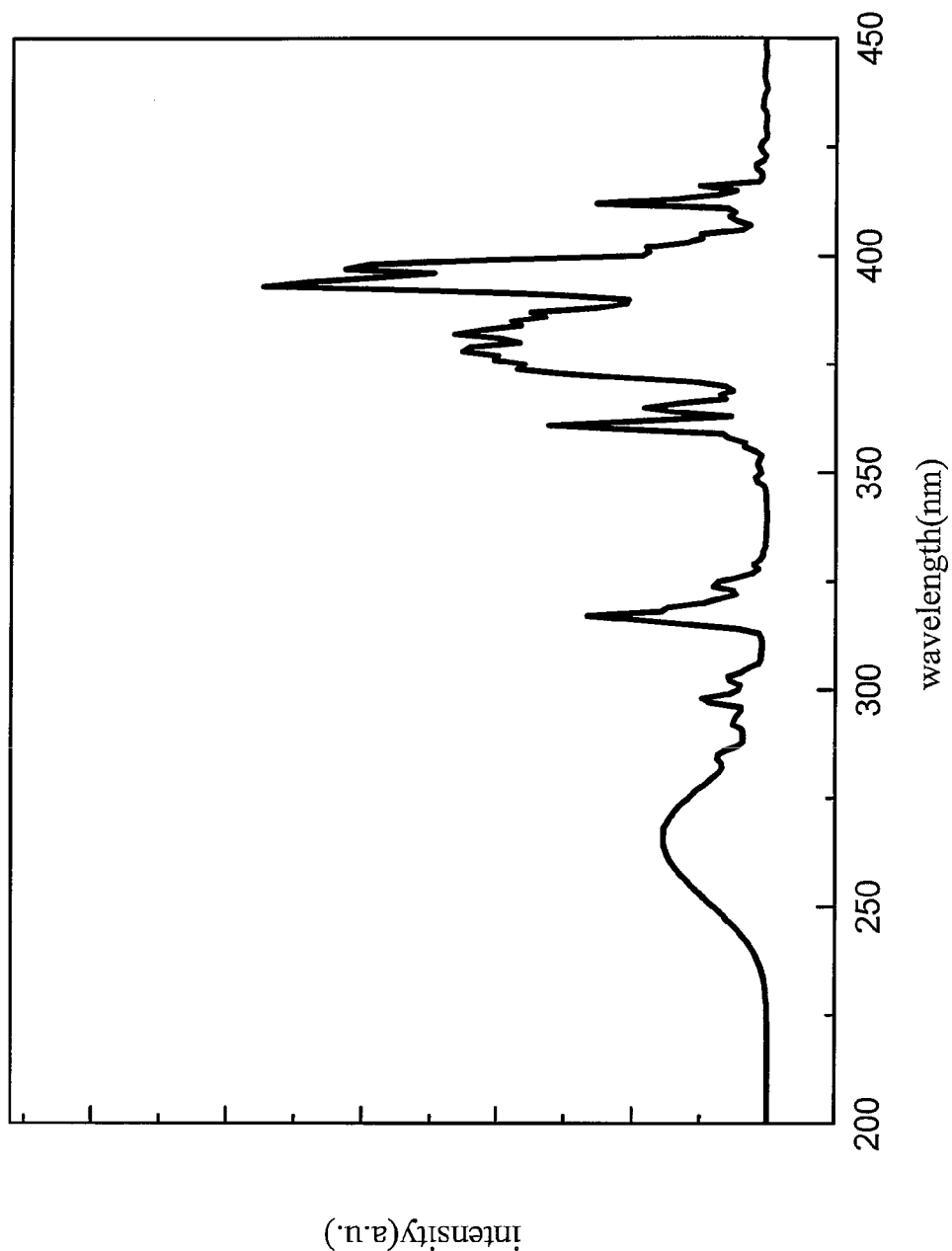
FIG. 11 is a photoluminescence excitation spectrum of the borate phosphor $Zn_{0.9}B_2O_4:Eu^{3+}_{0.1}$ in one example of the disclosure.
Figure 12:
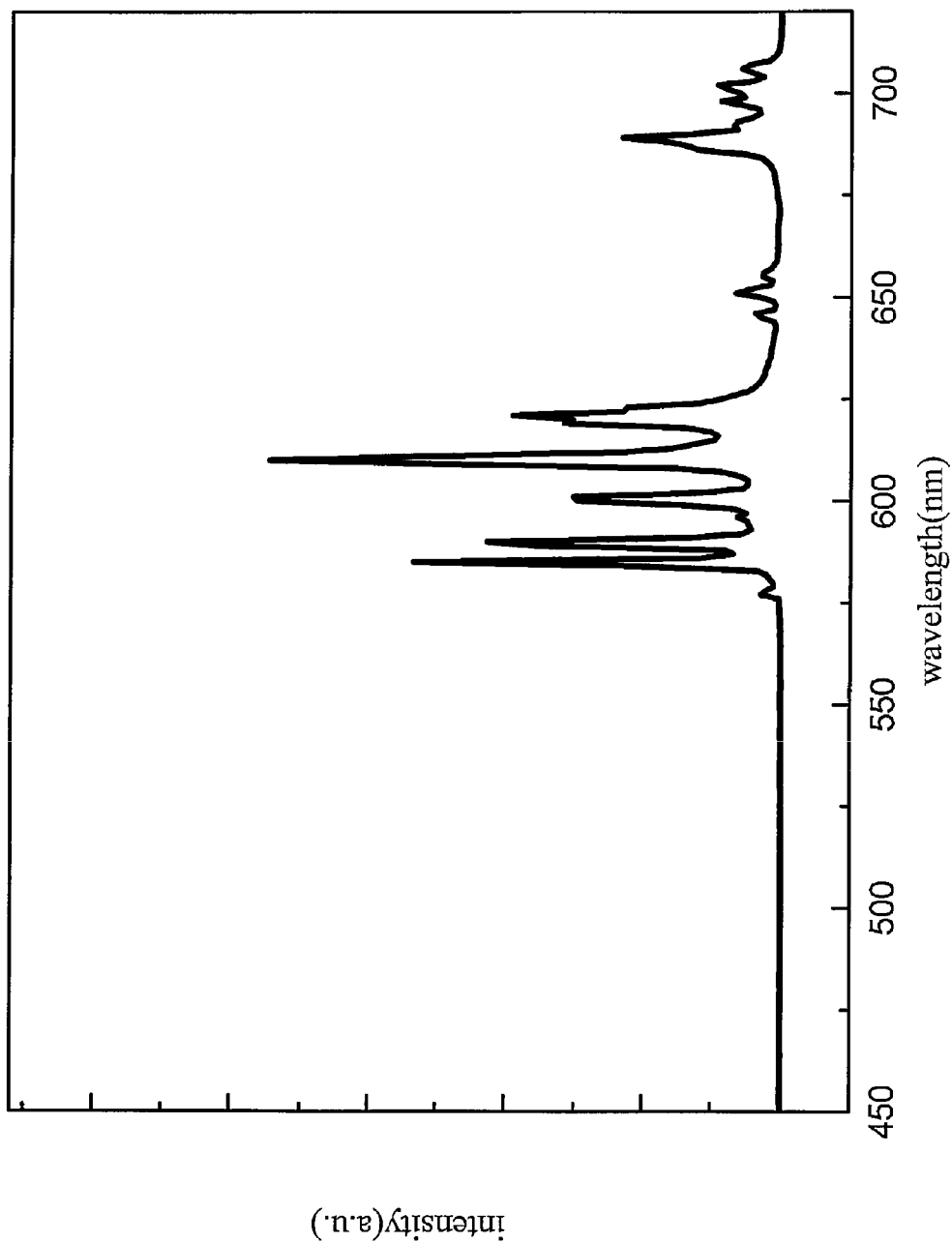
FIG. 12 is a photoluminescence emission spectrum of the borate phosphor $Zn_{0.9}B_2O_4:Eu^{3+}_{0.1}$ in one example of the disclosure.

0.9 mol of ZnO (0.4504 g, FW=81.389, commercially available from ACROS, 99.99%), 2 mol of $H_3BO_3$ (0.6193 g, FW=61.932, commercially available from STREM, 99.9995%), and 0.05 mol of $Eu_2O_3$ (0.0880 g, FW=351.917, commercially available from ALDRICH, 99.9%) were weighted, evenly mixed and grinded, and charged in a double-crucible. The double-crucible was then stuffed by graphite, and then heated in a high temperature furnace. After sintering in air at 850° C. for about 10 hours, washing, filtering, and heat drying, pure phase of the borate phosphor $Zn_{0.9}B_2O_4:Eu^{3+}_{0.1}$ was prepared. The photoluminescence excitation and emission spectra of the described product are shown in FIGS. 11 and 12, respectively. The major peak of the excitation band is 393 nm, the major peak of the emission band is 610 nm, and the CIE coordination is (0.62, 0.35).

Example 7

Figure 13:
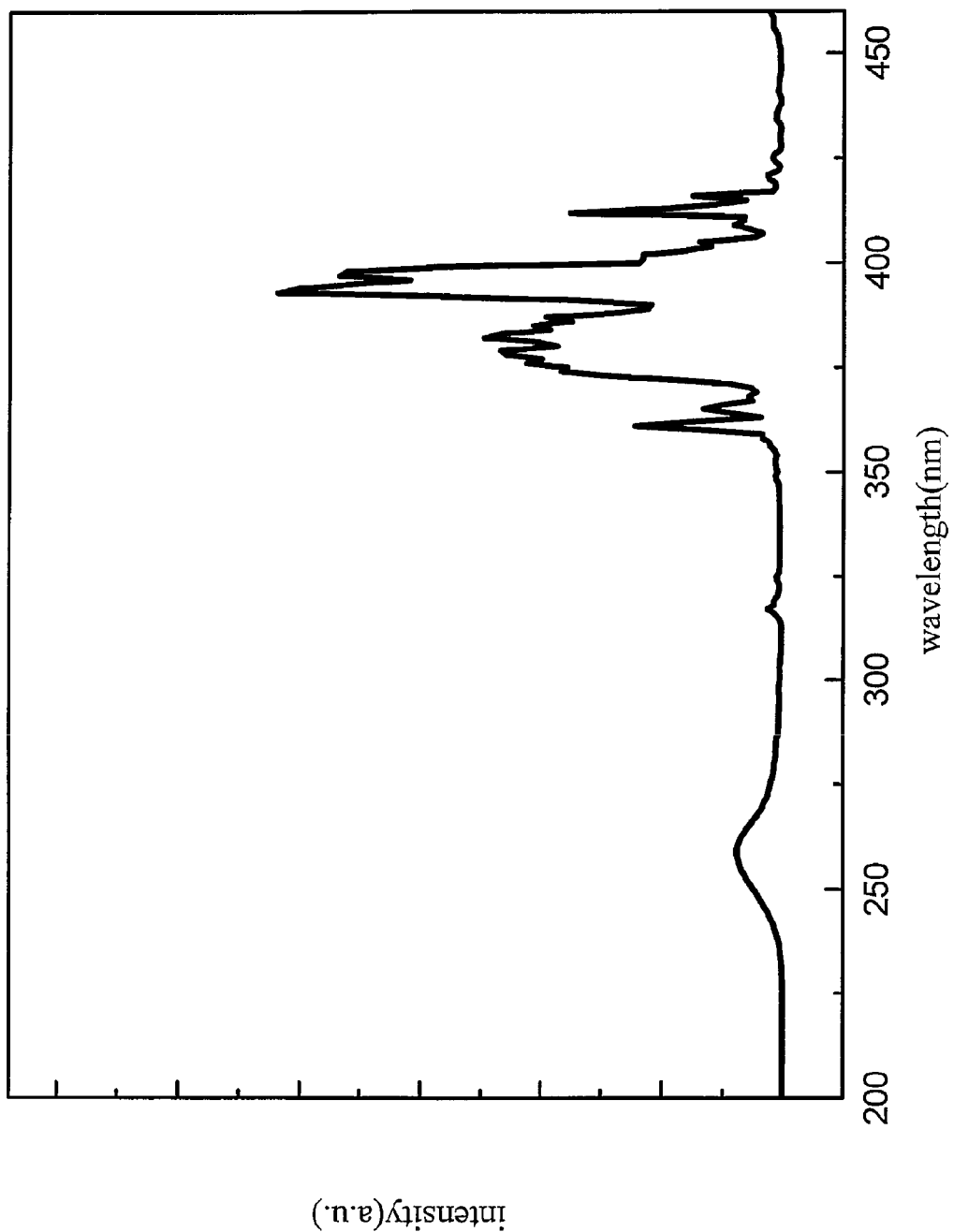
FIG. 13 is a photoluminescence excitation spectrum of the borate phosphor $Zn_{0.8}B_2O_4:Eu^{3+}_{0.1}$, $Bi^{3+}_{0.1}$ in one example of the disclosure.
Figure 14:
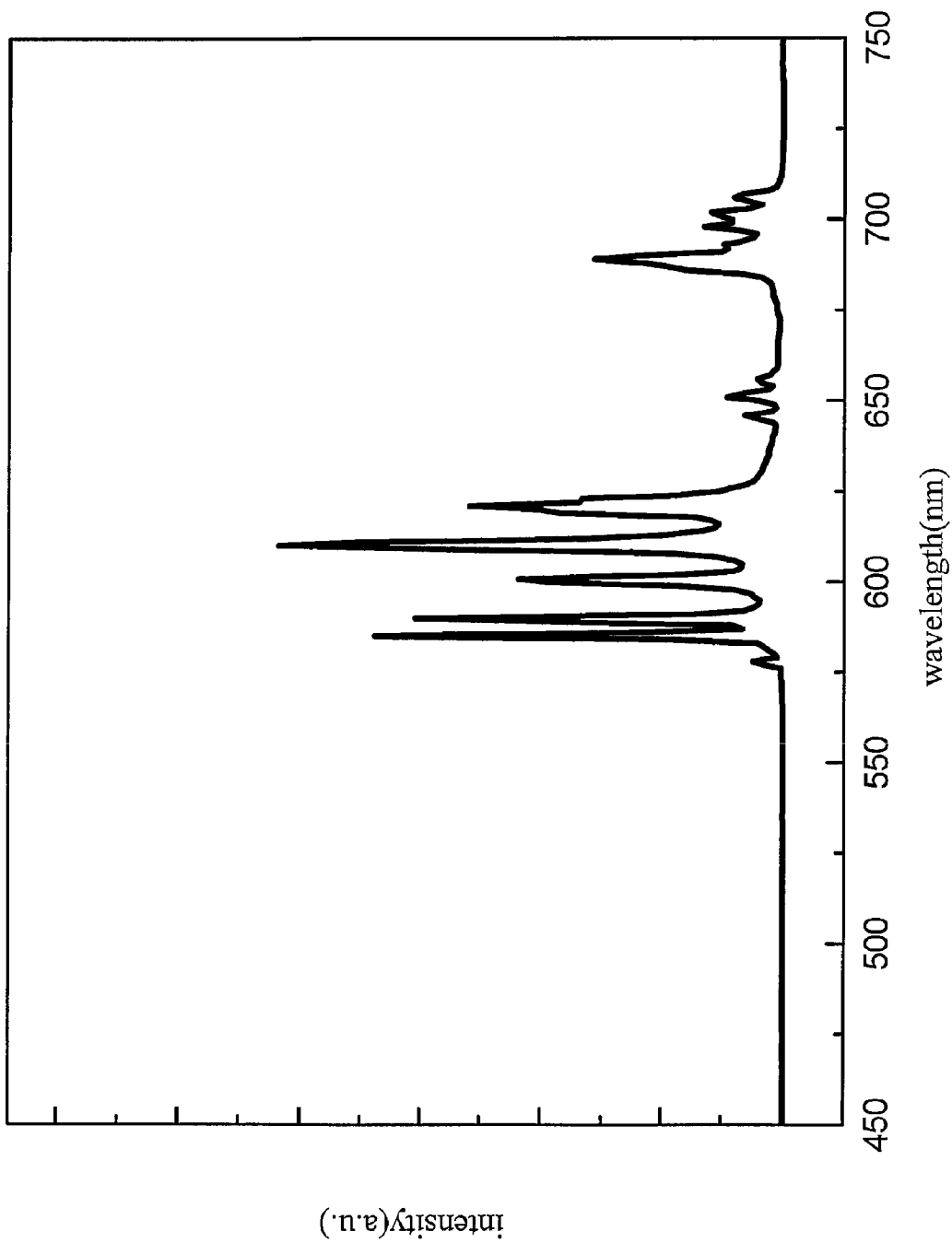
FIG. 14 is a photoluminescence emission spectrum of the borate phosphor $Zn_{0.8}B_2O_4:Eu^{3+}_{0.1}$, $Bi^{3+}_{0.1}$ in one example of the disclosure.

0.8 mol of ZnO (0.3256 g, FW=81.389, commercially available from ACROS, 99.99%), 2 mol of $H_3BO_3$ (0.6193 g, FW=61.932, commercially available from STREM, 99.9995%), 0.05 mol of $Eu_2O_3$ (0.0880 g, FW=351.917, commercially available from ALDRICH, 99.9%), and 0.05 mol of $Bi_2O_3$ (0.1165 g, FW=465.957, commercially available from STREM, 99.999%) were weighted, evenly mixed and grinded, and charged in a double-crucible. The double-crucible was then stuffed by graphite, and then heated in a high temperature furnace. After sintering in air at 850° C. for about 10 hours, washing, filtering, and heat drying, pure phase of the borate phosphor $Zn_{0.8}B_2O_4:Eu^{3+}_{0.1},Bi^{3+}_{0.1}$ was prepared. The photoluminescence excitation and emission spectra of the described product are shown in FIGS. 13 and 14, respectively. The major peak of the excitation band is 393 nm, the major peak of the emission band is 610 nm, and the CIE coordination is (0.63, 0.36).

Example 8

Figure 15:
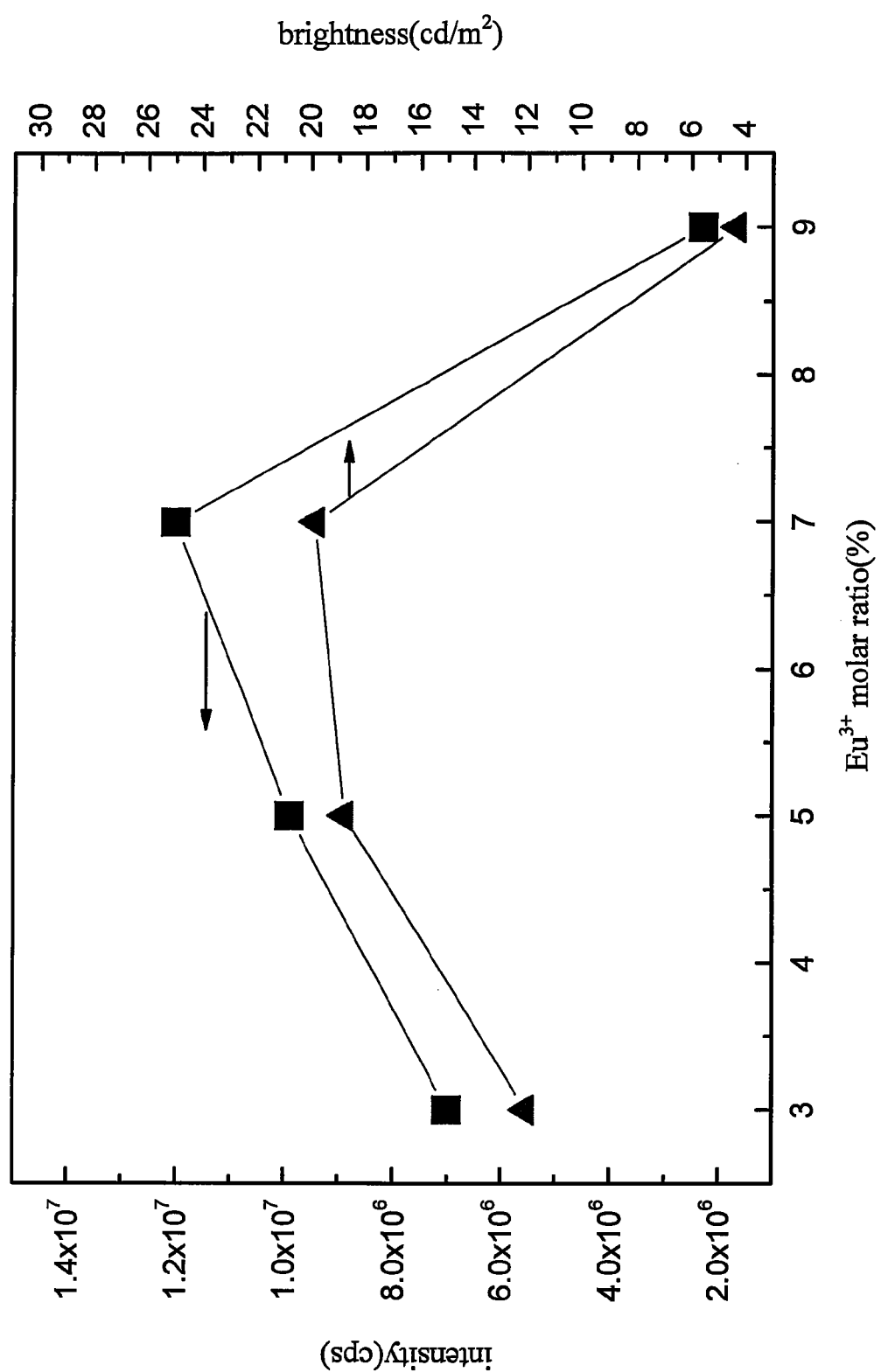
FIG. 15 is a comparison of photoluminescence intensity and brightness of $Ca_{1-x}AlBO_4:Eu^{3+}_x$ with different x ratios in one example of the disclosure.
Figure 16:
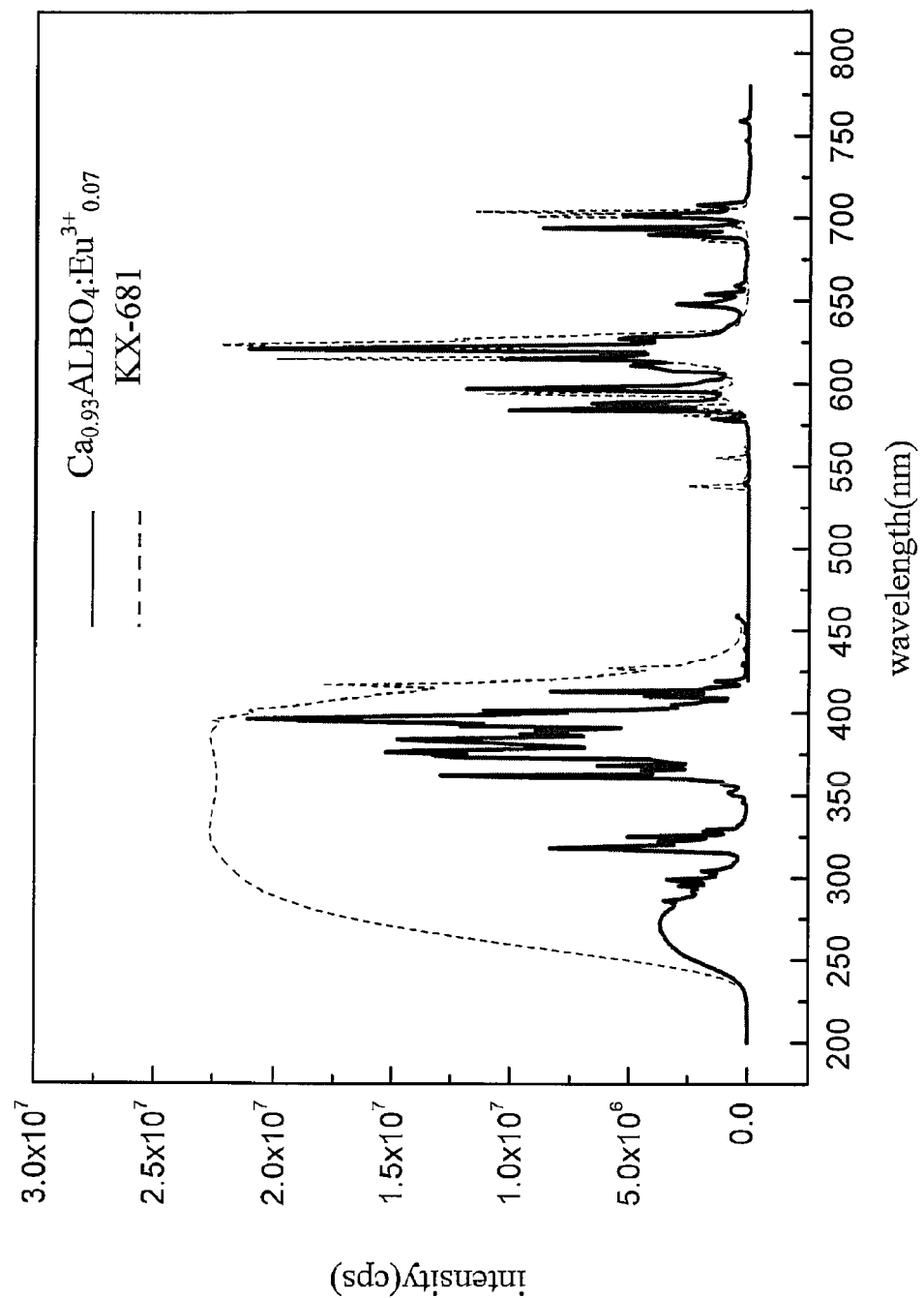
FIG. 16 is a comparison of the photoluminescence spectrum between the borate phosphor $Ca_{0.93}AlBO_4:Eu^{3+}_{0.07}$ and Kasei KX681 in one example of the disclosure.

Similar to Example 1, appropriate stoichiometry of $CaCO_3$, $Al_2O_3$, $B_2O_3$, and $Eu_2O_3$ were weighted, evenly mixed and grinded, and charged in a double-crucible. The double-crucible was then stuffed by graphite, and then heated in a high temperature furnace. After sintering in air at 1000° C. for about 10 hours, washing, filtering, and heat drying, pure phase of the borate phosphors $Ca_{1-x}AlBO_4:Eu^{3+}_x$ with different x ratios were prepared. FIG. 15 shows a comparison of photoluminescence intensity and brightness of $Ca_{1-x}AlBO_4:Eu^{3+}_x$ with different x ratios (x=0.03, 0.05, 0.07, and 0.09). When x is 0.07 (Example 1), the borate phosphor has the strongest emission brightness and photoluminescence emission intensity. Comparing with the Kasei KX681 ($Y_2O_2S:Eu^{3+}$, CIE coordination (0.66, 0.33), commercially available from Kasei), the borate phosphor $Ca_{0.93}AlBO_4:Eu^{3+}_{0.07}$ in Example 1 has similar photoluminescence emission intensity and better color saturation. The comparison of the photoluminescence spectrum between the borate phosphor $Ca_{0.93}AlBO_4:Eu^{3+}_{0.07}$ and KX681 is shown in FIG. 16. The photoluminescence emission intensity of the borate phosphor $Ca_{0.93}AlBO_4:Eu^{3+}_{0.07}$ reached 95% photoluminescence emission intensity of KX681. The photoluminescence emission integral area of the borate phosphor $Ca_{0.93}AlBO_4:Eu^{3+}_{0.07}$ reached 96% photoluminescence emission integral area of KX681.

Example 9

Figure 17:
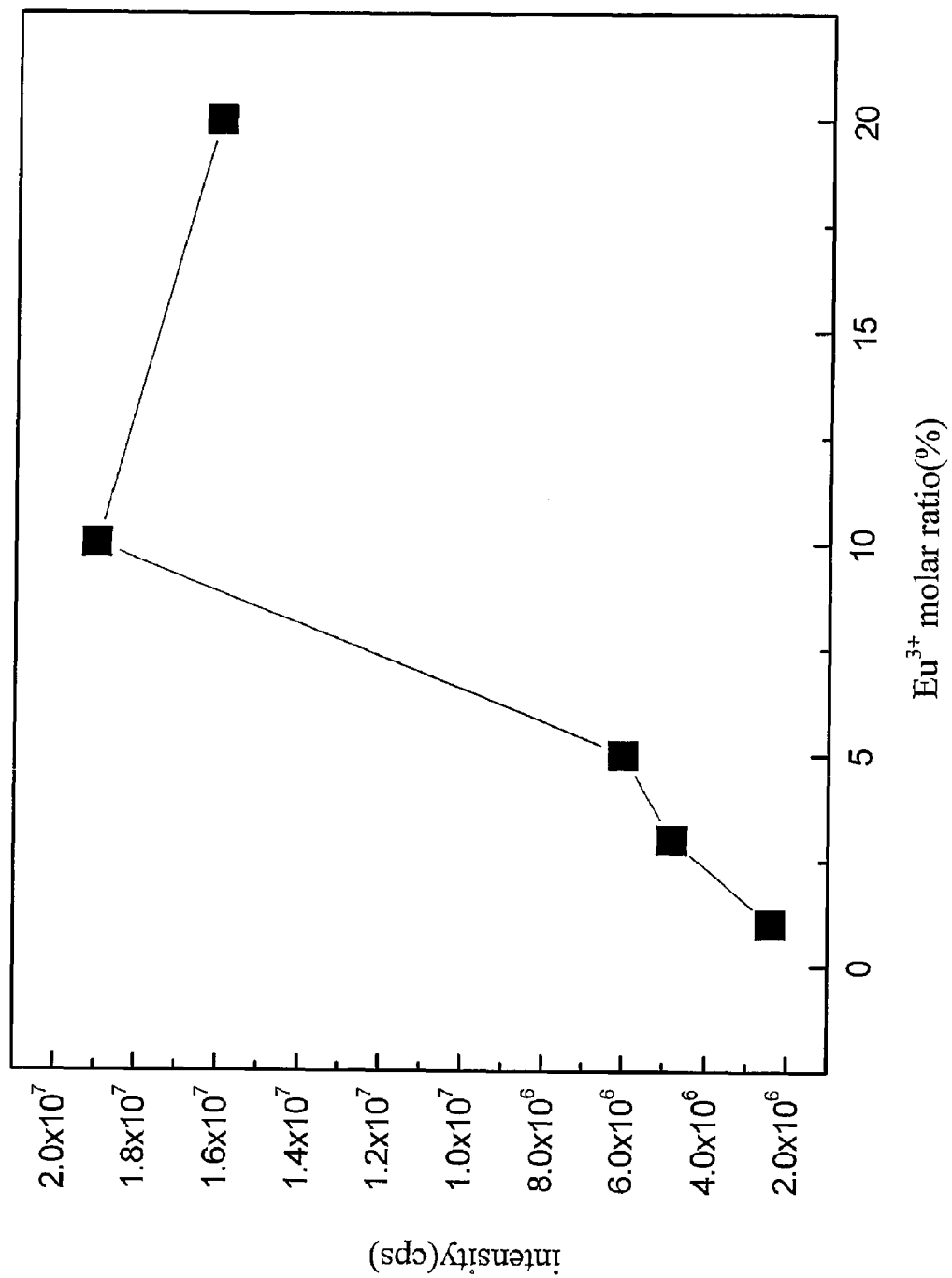
FIG. 17 is a comparison of photoluminescence intensity of $Zn_{1-x}B_2O_4:Eu^{3+}_x$ with different x ratios in one example of the disclosure.
Figure 18:
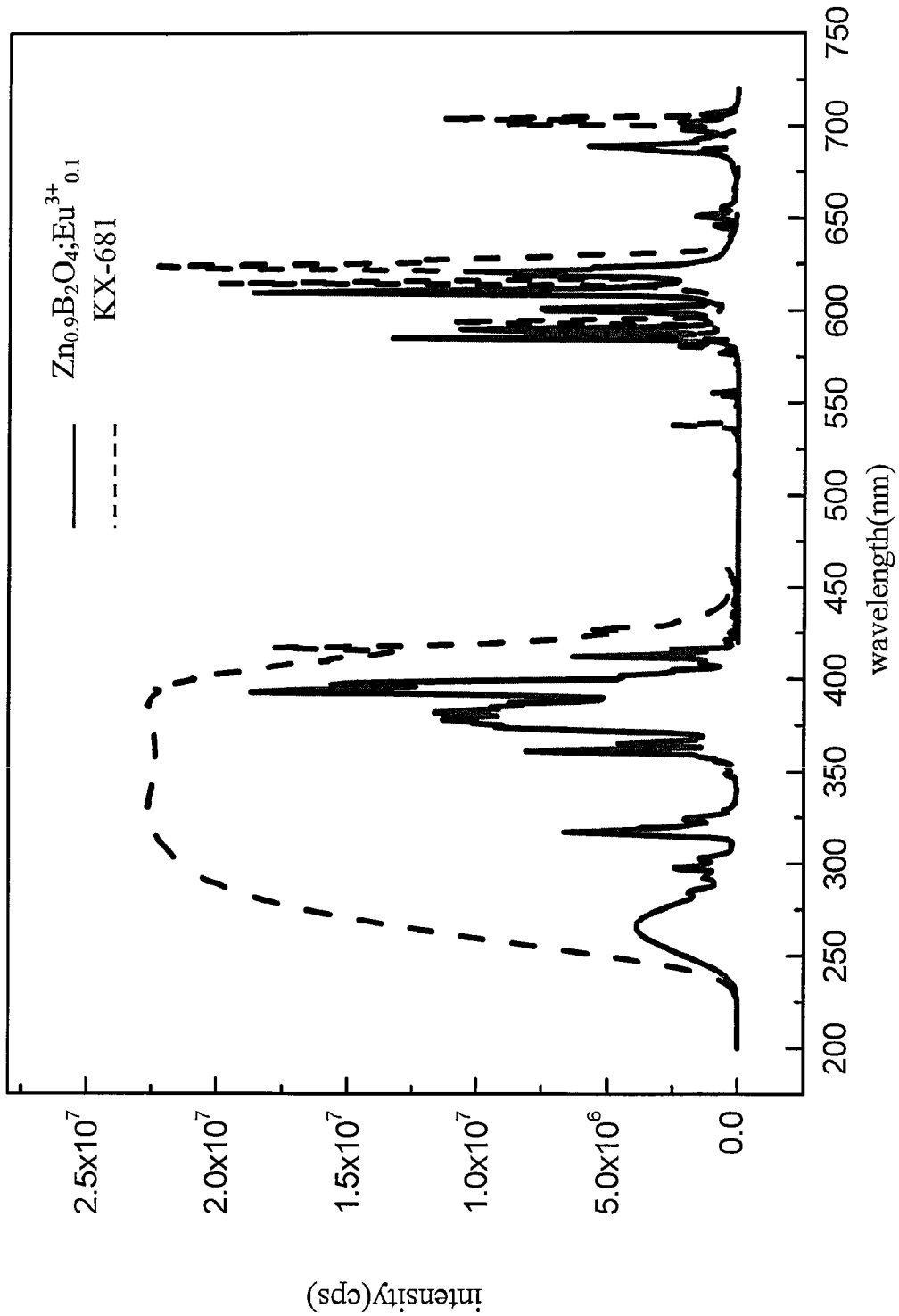
FIG. 18 is a comparison of the photoluminescence spectrum between the borate phosphor $Zn_{0.9}B_2O_4:Eu^{3+}_{0.1}$ and Kasei KX681 in one example of the disclosure.

Similar to Example 6, appropriate stoichiometry of ZnO, $H_3BO_3$, and $Eu_2O_3$ were weighted, evenly mixed and grinded, and charged in a double-crucible. The double-crucible was then stuffed by graphite, and then heated in a high temperature furnace. After sintering in air at 850° C. for about 10 hours, washing, filtering, and heat drying, pure phase of the borate phosphors $Zn_{1-x}B_2O_4:Eu^{3+}_x$ with different x ratios were prepared. FIG. 17 shows a comparison of photoluminescence intensity of $Zn_{1-x}B_2O_4:Eu^{3+}_x$ with different x ratios (x=0.01, 0.03, 0.05, 0.1, and 0.2). When x is 0.1 (Example 6), the borate phosphor has the strongest photoluminescence emission intensity. Comparing with the Kasei KX681, the borate phosphor $Zn_{0.9}B_2O_4:Eu^{3+}_{0.1}$ in Example 6 has similar photoluminescence emission intensity and better color saturation. The comparison of the photoluminescence spectrum between the borate phosphor $Zn_{0.9}B_2O_4:Eu^{3+}_{0.1}$ and KX681 is shown in FIG. 18.

The photoluminescence emission intensity of the borate phosphor $Zn_{0.9}B_2O_4:Eu^{3+}_{0.1}$ reached 83% photoluminescence emission intensity of KX681. The photoluminescence emission integral area of the borate phosphor $Zn_{0.9}B_2O_4:Eu^{3+}_{0.1}$ reached 80% photoluminescence emission integral area of KX681.

Example 10

Figure 19:
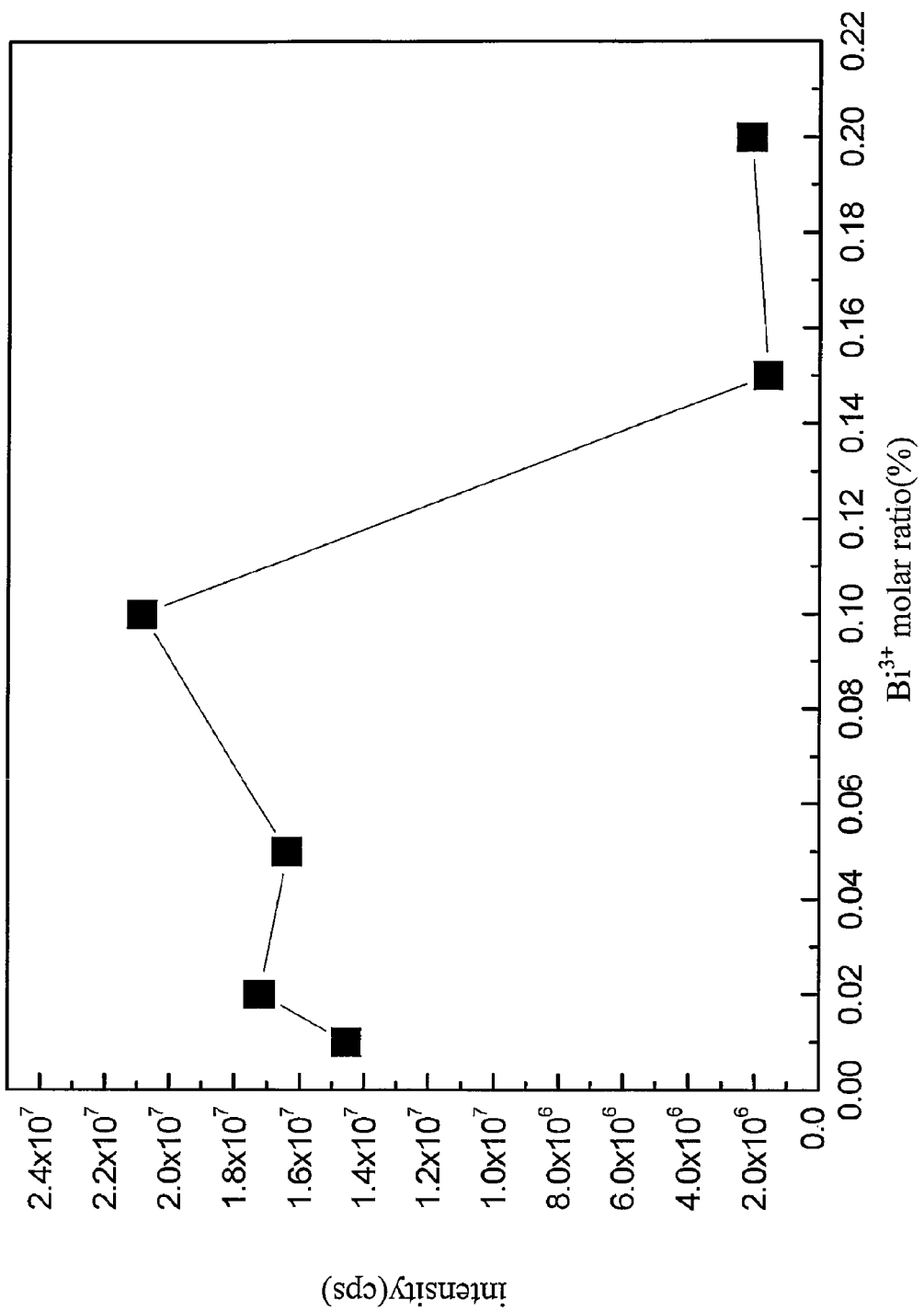
FIG. 19 is a comparison of photoluminescence intensity of $Zn_{0.9-y}B_2O_4:Eu^{3+}_{0.1}$, $Bi^{3+}_y$ with different y ratios in one example of the disclosure.
Figure 20:
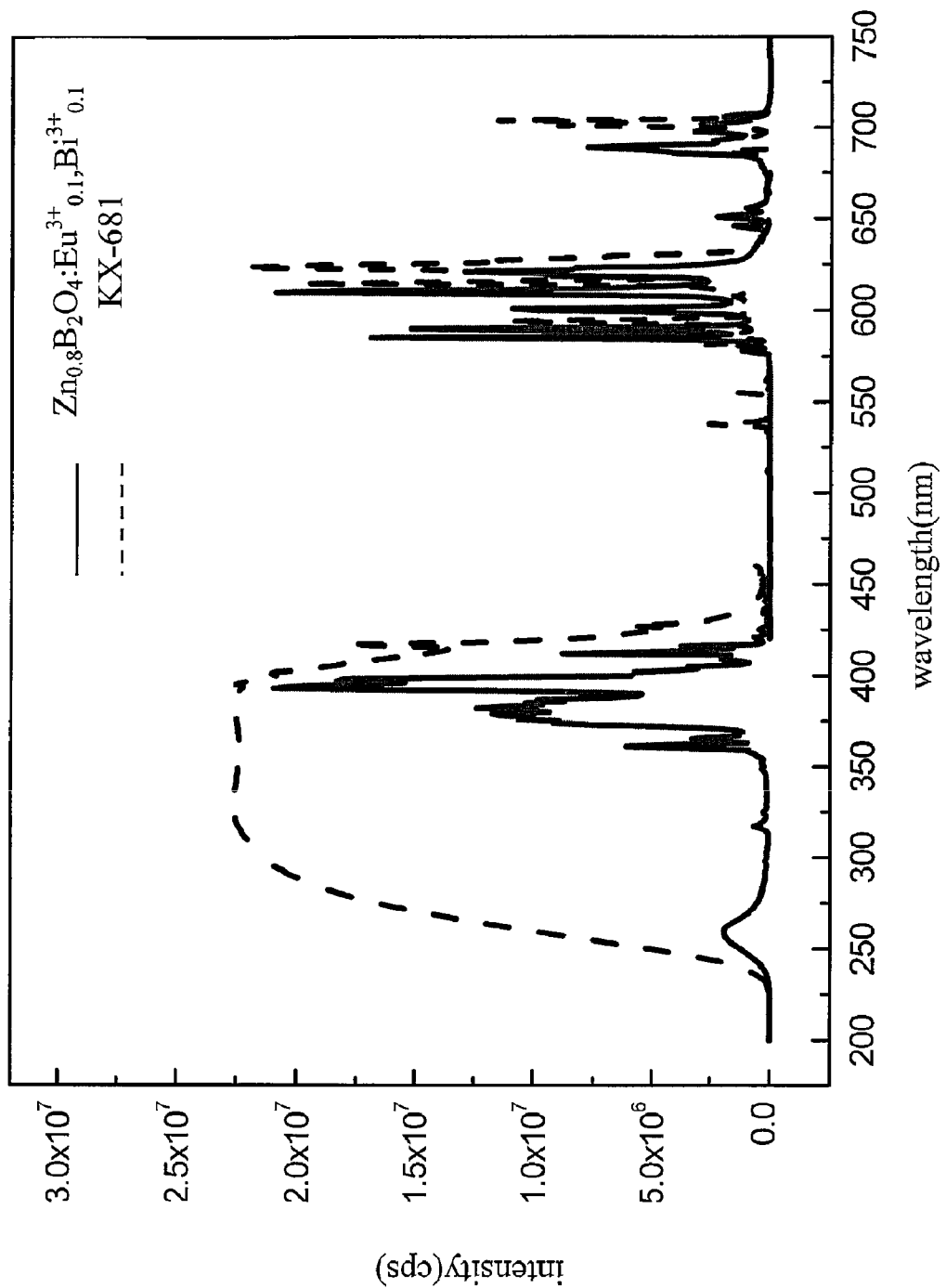
FIG. 20 is a comparison of the photoluminescence spectrum between the borate phosphor $Zn_{0.9-y}B_2O_4:Eu^{3+}_{0.1}$, $Bi^{3+}_{0.1}$ and Kasei KX681 in one example of the disclosure.

Similar to Example 7, appropriate stoichiometry of ZnO, $H_3BO_3$, $Eu_2O_3$, and $Bi_2O_3$ were weighted, evenly mixed and grinded, and charged in a double-crucible. The double-crucible was then stuffed by graphite, and then heated in a high temperature furnace. After sintering in air at 850° C. for about 10 hours, washing, filtering, and heat drying, pure phase of the borate phosphors $Zn_{0.9-y}B_2O_4:Eu^{3+}_{0.1}, Bi^{3+}_{y}$ with different y ratios were prepared. FIG. 19 shows a comparison of photoluminescence intensity of $Zn_{0.9-y}B_2O_4:Eu^{3+}_{0.1}, Bi^{3+}_{y}$ with different y ratios (y=0.01, 0.02, 0.05, 0.1, 0.15, and 0.2). When y is 0.1 (Example 7), the borate phosphor has the strongest photoluminescence emission intensity. Comparing with the Kasei KX681, the borate phosphor $Zn_{0.8}B_2O_4:Eu^{3+}_{0.1}, Bi^{3+}_{0.1}$ in Example 7 has similar photoluminescence emission intensity and better color saturation. The comparison of the photoluminescence spectrum between the borate phosphor $Zn_{0.8}B_2O_4:Eu^{3+}_{0.1}, Bi^{3+}_{0.1}$ and KX681 is shown in FIG. 20. The photoluminescence emission intensity of the borate phosphor $Zn_{0.8}B_2O_4:Eu^{3+}_{0.1}, Bi^{3+}_{0.1}$ reached 94% photoluminescence emission intensity of KX681. The photoluminescence emission integral area of the borate phosphor $Zn_{0.8}B_2O_4:Eu^{3+}_{0.1}, Bi^{3+}_{0.1}$ reached 104% photoluminescence emission integral area of KX681.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A borate phosphor, having a formula:
$Zn_{0.9-y}B_2O_4:Eu^{3+}_{0.1}, Bi^{3+}_{y}$,
wherein
$0.01 \leq y \leq 0.2$.

2. The borate phosphor as claimed in claim 1 is $Zn_{0.8}B_2O_4:EU^{3+}_{0.1}, Bi^{3+}_{0.1}$, wherein the borate phosphor is excited by 200-400nm UV or 400-470nm blue light to emit a red light, and the red light has a major emission peak of about 610nm and a CIE coordination of (0.63, 0.36).

3. A white light illumination device, comprising the borate phosphor as claimed in claim 1 and an excitation light source, wherein the excitation light source emits 200-400nm UV or 400-470nm blue light.

4. The white light illumination device as claimed in claim 3, wherein the excitation light source comprises a light emitting diode or a laser diode.

5. The white light illumination device as claimed in claim 3, further comprising a blue phosphor and a green phosphor.

6. The white light illumination device as claimed in claim 5, wherein the blue phosphor comprises $BaMgAl_{10}O_{17}:Eu^{2+}$, $(Ba,Sr,Ca)_5(PO_4)_3(F,Cl,Br,OH):Eu^{2+}$, $2SrO*0.84P_2O_5*0.16B_2O_3:Eu^{2+}$, $Sr_2Si_3O_8*2SrCl_2:Eu^{2+}$, or $(Mg,Ca,Sr,Ba,Zn)_3B_2O_6:Eu^{2+}$.

7. The white light illumination device as claimed in claim 5, wherein the green phosphor comprises $BaMgAl_{10}O_{17}:Eu^{2+}, Mn^{2+}$, $SrGa_2S_4:Eu^{2+}$, $(Ca,Sr,Ba)Al_2O_4:Eu^{2+}, Mn^{2+}$, $(Ca,Sr,Ba)_4Al_{14}O_{25}:Eu^{2+}$, or $Ca_8Mg(SiO_4)_4Cl_2:Eu^{2+}, Mn^{2+}$.

* * * * *